April 6, 1965   M. O. HOLOWATY ETAL   3,177,361
METAL SHEET OF PHOSPHORESCENT OR FLUORESCENT
SURFACE PROPERTIES
Filed Jan. 8, 1960
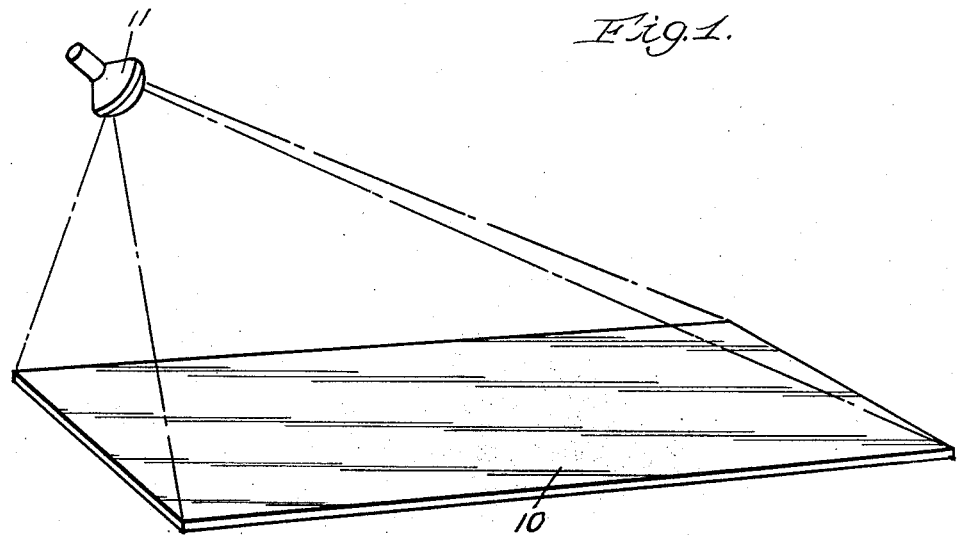
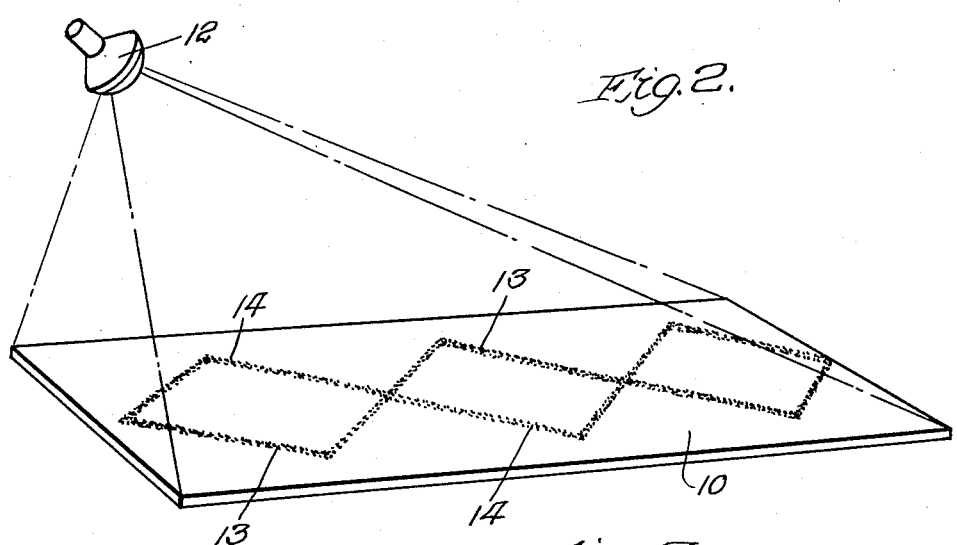
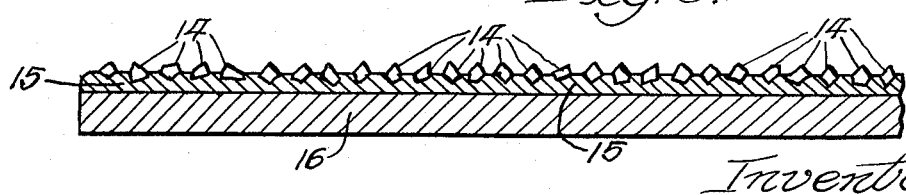
Inventors:
Michael O. Holowaty,
Edmund S. Madrzyk,
By Merriam, Smith, Marshall, Attys.

3,177,361
METAL SHEET OF PHOSPHORESCENT OR
FLUORESCENT SURFACE PROPERTIES
Michael O. Holowaty, Gary, Ind., and Edmund S. Madrzyk, Lansing, Ill., assignors to Inland Steel Company, Chicago, Ill., a corporation of Delaware
Filed Jan. 8, 1960, Ser. No. 1,251
10 Claims. (Cl. 250—79)

This invention relates to a sheet or panel having a phosphorescent or fluorescent surface and the method of making same. The sheet or panel comprises a base plate, one or more surfaces of which are covered by a metallic carrier film having heat resistant phosphors in the form of particles or grit suspended or embedded therein.

In the past, metal sheets or panels having reflective surfaces have been produced by applying glass beads or reflective particles to metal sheets or panels. For example, glass particles which are made to adhere to the metal by various types of adhesives, enamels, paints or other common carrier agents. These reflective surfaces operate on a principle in which they reflect some and absorb some of the light which impinges upon the reflective particles in a manner to disclose a design or wording contained thereon.

The present invention has a phosphorescent or fluorescent surface which when being activated by a suitable light source emits light of a different wave length from that impinging upon it rather than absorbing it as heat. The surface of the present invention acts more as a light transformer than as a reflector or absorber of light.

In the accompanying drawing:
FIG. 1 is a perspective view of a metallic panel under the influence of a polychromatic light source;
FIG. 2 is a perspective view of the same panel as shown in FIG. 1, this time under the sole influence of a monochromatic light source, such as ultraviolet light; and
FIG. 3 is a side view of a metallic panel broken away to show the carrier film with the suspended phosphors covering one surface of the base metal plate.

Now making reference to the drawing and first to FIG. 1, a panel 10 is shown which is under the influence of light from a polychromatic light source 11, said light source being incapable of exciting the phosphors to the emission of light which is distinguishable by its color characteristics. Since the phosphors suspended in the carrier film do not fluoresce or phosphoresce distinguishably under the influence of light from such a light source the panel appears to be a plain panel which merely reflects the light impinging thereon.

In FIG. 2 is shown the same panel 10 under the sole influence of a monochromatic light source 12, such as ultraviolet light which is not perceived by the eye directly, but under the influence of such a light source the design 13 as shown in FIG. 2 becomes visible due to the fluorescence and phosphorescence of the phosphors 14 which have been activated by the radiant energy transmitted from the light source so as to emit visible light which having changed color characteristics from the invisible impinging light will produce the design shown. Any one of many designs having a multitude of purposes are arranged in the carrier film depending upon the ultimate use to which the panel is to be subjected. The carrier film 15 should be chosen so that it is suitable for the suspension of heat resistant phosphors such as calcium tungstate, magnesium tungstate, zinc silicate, calcium halophosphates, cadmium silicate and cadmium borate, the said phosphors being able to withstand heat in a range of 600° F. to 700° F. and remain in a solid state without going into solution in the carrier film which is molten in this temperature range. The carrier film 15 should also have a density greater than that of the phosphors to permit the phosphors to remain in suspension in the carrier film. The suspension or floating of the phosphors in the carrier film allows them to be more readily exposed upon machining of the surface. The exposing of the phosphors can be accomplished by a process of grinding away the excess carrier film which may have covered the phosphors or by other suitable machining operation.

In FIG. 3 of the drawings, 16 is a base metal plate which is of steel or other suitable opaque base metal, a metallic opaque, non-phosphorescent alloy carrier film 15 is shown covering one surface of the base metal plate, and 14 is a series of phosphors which have been suspended in the alloy carrier film by specific purpose design, uniformly or at random and the said phosphors 14 through the process of grinding or other suitable machining operation have been exposed so as to be capable of phosphorescing or fluorescing under the influence of a monochromatic light or the like.

After the combination of phosphors 14 and carrier film 15 has been formed it is applied to the surface of the base metal plate 16 so as to cover or coat one or more surfaces to which it has been applied. The coated panel is then cooled to permit setting of the molten carrier film and to allow the carrier film to adhere to the surface of the metal plate. When the coated panel has been sufficiently cooled it can be ground or otherwise suitably machined so as to permit the phosphors to become exposed so that under the influence of a monochromatic light or like, they will phosphoresce or fluoresce to produce a desired design or identifying symbol. Such a coated panel can then be applied in numerous ways for purposes of advertising, identification, in safety devices and in any one of numerous other suitable applications.

The novel surface of the present invention may be activated by radiant energy from any one of several sources such as an electron beam, a light ray, particularly monochromatic light rays, or the like. The phosphorescent or fluorescent property of this novel metal sheet is exceptionally useful in advertising displays, road signs, safety devices, building panels and the like. The phosphorescent or fluorescent surface may contain designs for specific purposes composed of phosphors which reflect light when energized by an ordinary light source but under the sole influence of a monochromatic light, such as ultraviolet light in a darkened room or the like, the phosphors are so excited to disclose the specific purpose design. The property to phosphoresce or fluoresce under the influence of radiant energy from a monochromatic light or from an electron beam can be especially useful for purposes of identification, as when used in identifying the work product of a particular manufacturer. This is accomplished for example, where the phosphors have been embedded so as to produce an identifying symbol or mark when they are made to emit light under the influence of a proper excitation source.

Another novel feature of this present invention is that the phosphors are suspended in a molten metallic carrier film without the phosphors going into solution. This is accomplished by controlling the temperature and density of the carrier film. The carrier film phosphor combination once formed is applied as a covering surface to a base metal plate as in a metalizing process. Some of the phosphors which are capable of being suspended in the carrier film are calcium tungstate, magnesium tungstate, zinc silicate, calcium halophosphates, cadmium silicate and cadmium borate and the like. The phosphors so suspended in the carrier film are ultimately exposed to the surface thereof so as to be capable of phosphorescing or fluorescing under the influence of light of a pre-determined wave length such as a monochromatic light of a specific wave length or under the influence of a beam of electrons being emitted from an electron gun. The novel combination of phosphorescent particles suspended in a metallic carrier film may be applied in manners and for purposes which the reflective surfaces heretofore used in the art could neither be applied or used effectively.

While the above description and method constitute a preferred embodiment of this invention it is obvious that the invention may be otherwise embodied or practiced so that all modifications which fall within the scope of the following claims are understood to have been intended.

What is claimed is:

1. An article of manufacture comprising: a metallic opaque base plate; a metallic opaque, non-phosphorescent carrier film covering a surface of said plate; and partially exposed phosphorescent particles suspended in said carrier film.

2. A phosphorescent metal panel comprising:
   a metallic, opaque base plate;
   a metallic, opaque, non-phosphorescent carrier film covering a surface of said plate;
   and partially exposed phosphorescent particles suspended in said film and sensitive to light from a monochromatic source.

3. A phosphorescent metal panel comprising:
   a metallic, opaque base plate;
   a metallic, opaque, non-phosphorescent carrier film covering a surface of said plate;
   and partially exposed phosphorescent particles suspended in said film and sensitive to a source of excitation.

4. A phosphorescent metal panel comprising: a metallic opaque base plate, a metallic, opaque, non-phosphorescent carrier film covering a surface of said plate; and partially exposed heat resistant phosphorescent phosphors suspended in said carrier film so as to be in an exposed position to phosphoresce under the influence of an excitation source impinging thereon.

5. A phosphorescent metal panel comprising: a metallic opaque base plate; a metallic opaque, non-phosphorescent carrier film covering a surface of said plate and partially exposed; phosphorescent particles, resistant to the high temperature of the metal carrier film when the latter is molten, suspended in said film so as to phosphoresce under the influence of an excitation source impinging on said particles.

6. A phosphorescent metal panel comprising: a metallic opaque base plate; a metallic opaque, non-phosphorescent carrier film covering a surface of said plate and partially exposed; heat resistant phosphorescent particles, having a density less than that of the carrier film, suspended in said film so as to phosphoresce under the influence of an excitation source impinging on said particles.

7. A phosphorescent metal panel comprising:
   a metallic, opaque, non-phosphorescent base plate;
   a solid metallic, opaque, non-phosphorescent carrier film, capable of being rendered molten in the temperature range 600–700° F., covering a surface of said plate;
   and partially exposed, phosphorescent particles suspended, as discrete particles, in said carrier film;
   said phosphorescent particles being capable of withstanding a temperature in the range 600–700° F. without going into solution in a molten carrier film;
   said carrier film having a density at a temperature in the range 600–700° F. which will maintain said phosphorescent particles in suspension, below the surface of said film.

8. A panel as recited in claim 7 wherein:
   said base plate is steel.

9. A panel as recited in claim 7 wherein:
   said phosphorescent particles are sensitive to light from a monochromatic source.

10. A panel as recited in claim 7 wherein:
    said particles are selected from the group consisting essentially of calcium tungstate, magnesium tungstate, zinc silicate, calcium halophosphates, cadium silicate, and cadmium borate.

References Cited by the Examiner

UNITED STATES PATENTS

| | | | |
|---|---|---|---|
| 1,364,950 | 1/21 | O'Hara | 250—79 |
| 1,902,440 | 3/33 | Gill | 250—77 |
| 2,069,307 | 2/37 | Henninger | 117—33.5 |
| 2,218,909 | 10/40 | Gill | 250—77 |
| 2,224,324 | 12/40 | Steenis | 250—80 |
| 2,240,706 | 5/41 | Law | 250—80 |
| 2,559,279 | 7/51 | Charles | 250—80 |
| 2,602,900 | 7/52 | Fraencket et al. | 250—80 |
| 2,660,539 | 11/53 | Putnam | 117—33.5 |
| 2,882,413 | 4/59 | Vingerhoets | 250—80 |
| 2,907,882 | 10/59 | Patten | 250—80 |
| 2,921,201 | 1/60 | Lieb | 250—71 |

RALPH G. NILSON, *Primary Examiner.*

ARCHIE R. BORCHELT, *Examiner.*

UNITED STATES PATENT OFFICE
CERTIFICATE OF CORRECTION

Patent No. 3,177,361                         April 6, 1965

Michael O. Holowaty et al.

It is hereby certified that error appears in the above numbered patent requiring correction and that the said Letters Patent should read as corrected below.

Column 1, line 20, strike out "which"; column 3, line 45 and column 4, line 2, after "plate", each occurrence, insert a semicolon; column 3, line 46 and column 4, line 3, after "exposed", each occurrence, strike out the semicolon; column 4, line 31, for "cadium" read -- cadmium --.

Signed and sealed this 14th day of September 1965.

(SEAL)
Attest:

ERNEST W. SWIDER
Attesting Officer

EDWARD J. BRENNER
Commissioner of Patents